(12) United States Patent
Koetje

(10) Patent No.: US 10,967,486 B2
(45) Date of Patent: *Apr. 6, 2021

(54) ARCHITECTURAL PANEL ASSEMBLY AND TOOLS

(71) Applicant: Timothy Koetje, Lynden, WA (US)

(72) Inventor: Timothy Koetje, Lynden, WA (US)

(73) Assignee: Axiom Construction and Consulting LLC, Lynden, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/897,207

(22) Filed: Jun. 9, 2020

(65) Prior Publication Data
US 2020/0298376 A1 Sep. 24, 2020

Related U.S. Application Data

(60) Continuation of application No. 16/285,626, filed on Feb. 26, 2019, now Pat. No. 10,675,737, which is a
(Continued)

(51) Int. Cl.
*E04B 2/00* (2006.01)
*B25B 11/00* (2006.01)
(Continued)

(52) U.S. Cl.
CPC ............... *B25B 11/00* (2013.01); *E04C 2/38* (2013.01); *E04C 2/40* (2013.01); *E04F 13/0846* (2013.01); *E04F 13/0848* (2013.01); *E04F 13/0891* (2013.01); *E04F 13/12* (2013.01); *G02F 1/00* (2013.01); *E04C 2002/001* (2013.01); *E04F 13/0816* (2013.01); *E04F 2201/0517* (2013.01)

(58) Field of Classification Search
CPC ........ E04C 2/38; E04C 2/40; E04C 2002/001; E04F 13/22; E04F 13/24; E04F 2201/0517; E04F 13/0846; E04F 13/0848; E04F 13/0891; E04F 13/12; G02F 1/00; B25B 11/00; E04B 2001/405
USPC ............................... 52/235, 506.01, 506.06
See application file for complete search history.

(56) References Cited

U.S. PATENT DOCUMENTS

| 5,226,274 A | 7/1993 | Sommerstein |
| 5,452,552 A | 9/1995 | Ting |

(Continued)

FOREIGN PATENT DOCUMENTS

CA 2869480 A1 5/2015

OTHER PUBLICATIONS

Noorda, Noorda.com, "3D Exposed Fastener WP" drawing, predates Jul. 14, 2016, 1 page.
(Continued)

*Primary Examiner* — Brent W Herring
*Assistant Examiner* — James J Buckle, Jr.
(74) *Attorney, Agent, or Firm* — Schacht Law Office, Inc.; Dwayne Rogge

(57) ABSTRACT

This application relates to the field of reveal architectural panels and a tool or clamp for assembly thereof. The apparatus and method replace prior art assembly methods and fasteners with adhesives and a dedicated particularly designed clamp to facilitate assembly. The frame members are modified to facilitate assembly with adhesive sealants and removal of mechanical fasteners.

3 Claims, 13 Drawing Sheets

Related U.S. Application Data continuation of application No. 15/284,193, filed on Oct. 3, 2016, now Pat. No. 10,213,905, which is a division of application No. 14/531,054, filed on Nov. 3, 2014, now Pat. No. 9,482,006.

(60) Provisional application No. 62/038,262, filed on Aug. 16, 2014, provisional application No. 61/899,132, filed on Nov. 1, 2013.

(51) Int. Cl.
*E04C 2/00* (2006.01)
*E04C 2/38* (2006.01)
*E04C 2/40* (2006.01)
*E04F 13/08* (2006.01)
*E04F 13/12* (2006.01)
*G02F 1/00* (2006.01)

(56) References Cited

U.S. PATENT DOCUMENTS

| | | | |
|---|---|---|---|
| 5,803,424 | A | 9/1998 | Keehn et al. |
| 6,581,354 | B1 | 6/2003 | Skarpness |
| 7,562,504 | B2 | 7/2009 | Herbst et al. |
| 8,127,507 | B1 | 3/2012 | Bilge |
| 8,973,739 | B2 | 3/2015 | Zieger |
| 9,091,079 | B2 | 7/2015 | Wright |
| 9,359,772 | B2 | 6/2016 | Prica et al. |
| 9,482,006 | B2 | 11/2016 | Koetje |
| 9,527,672 | B2 | 12/2016 | Batchelder et al. |
| 9,803,372 | B2 * | 10/2017 | Griffiths ............... E04F 13/083 |
| 9,850,666 | B2 | 12/2017 | Libreiro et al. |
| 9,914,591 | B2 | 3/2018 | DeGroot et al. |
| 10,208,484 | B1 | 2/2019 | Simonsen |
| 10,213,905 | B2 | 2/2019 | Koetje |
| 10,329,774 | B2 | 6/2019 | Koetje |
| 10,675,737 | B2 | 6/2020 | Koetje |
| 10,815,671 | B2 | 10/2020 | Koetje |
| 10,865,569 | B1 * | 12/2020 | Bilge ................... E04F 13/083 |
| 2002/0124514 | A1 | 9/2002 | Higgins |
| 2002/0152704 | A1 | 10/2002 | Thompson et al. |
| 2007/0022682 | A1 | 2/2007 | Morgenegg et al. |
| 2009/0241451 | A1 | 10/2009 | Griffiths |
| 2010/0037549 | A1 | 2/2010 | Lynch et al. |
| 2012/0017530 | A1 | 1/2012 | Hummel |
| 2012/0096799 | A1 | 4/2012 | Wright |
| 2013/0118107 | A1 | 5/2013 | Maday et al. |
| 2015/0121794 | A1 | 5/2015 | Koetje |
| 2015/0300027 | A1 | 10/2015 | Day et al. |
| 2015/0345152 | A1 | 12/2015 | Libreiro et al. |
| 2017/0021475 | A1 | 1/2017 | Koetje |
| 2019/0184527 | A1 | 6/2019 | Koetje |
| 2019/0316361 | A1 | 10/2019 | Koetje |

OTHER PUBLICATIONS

Noorda, Noorda.com, "3D NWT 1000" drawing, predates Jul. 14, 2016, 1 page.
Omega Panel Products, Laminators Inc. Product Technical Guide, Aluminum Composite Panels & Installation Systems; Jun. 2012, 16 pages.
Sobotec Architectural Wall System Solutions; SL-3000 Dry Joint Gasketed Extrusion System, Nov. 1, 2013, 1 page.

* cited by examiner

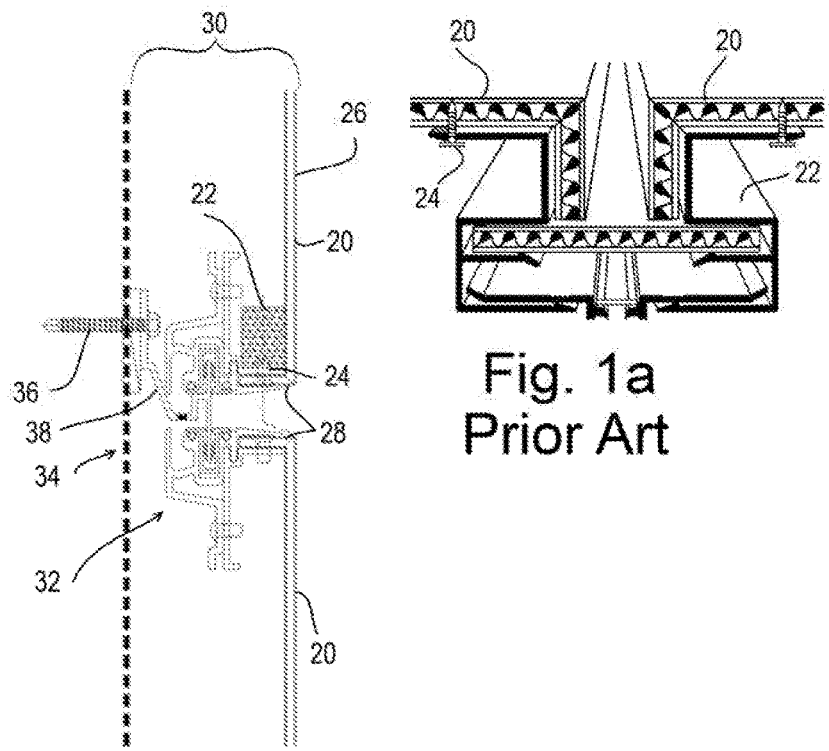
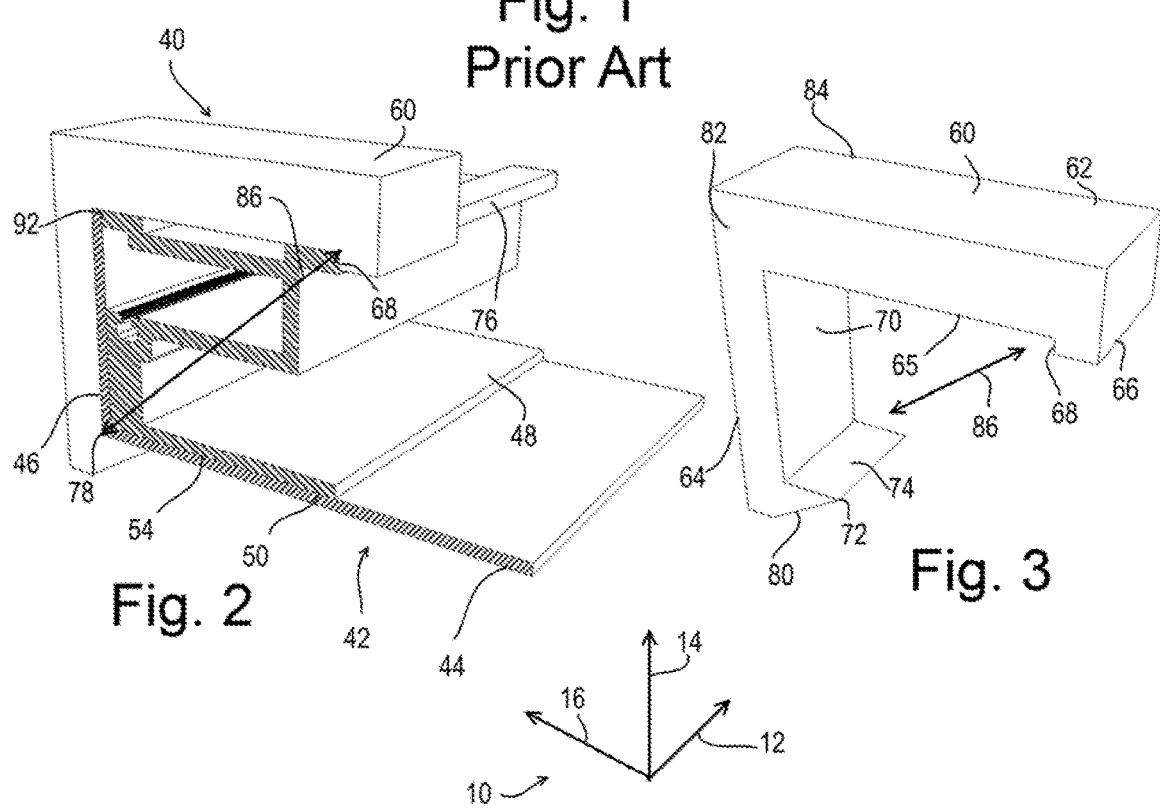
Fig. 1 Prior Art
Fig. 1a Prior Art
Fig. 2
Fig. 3

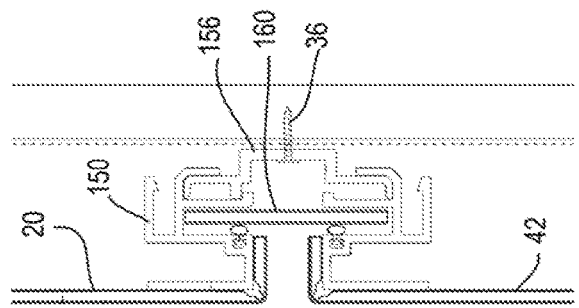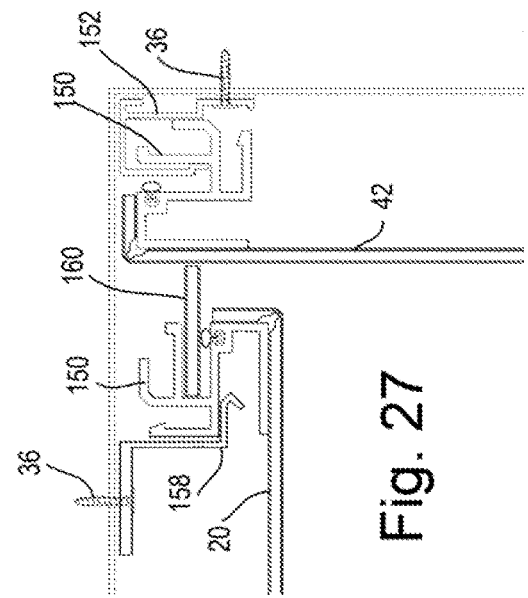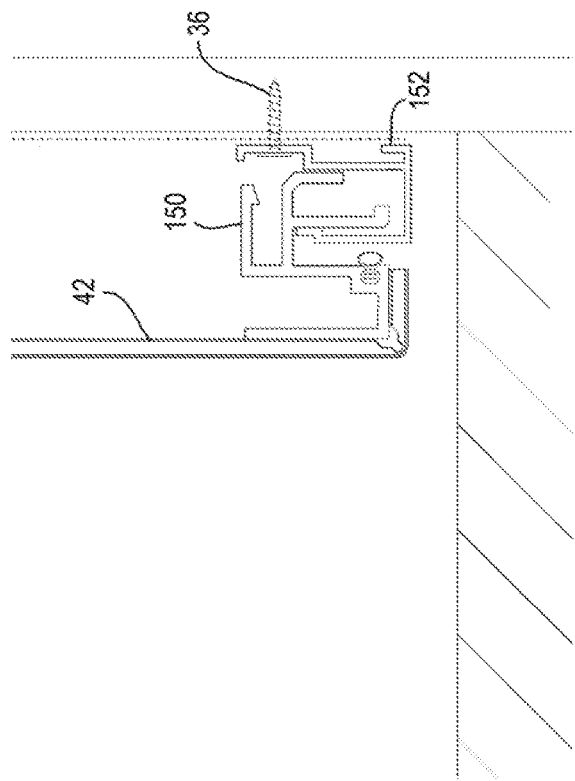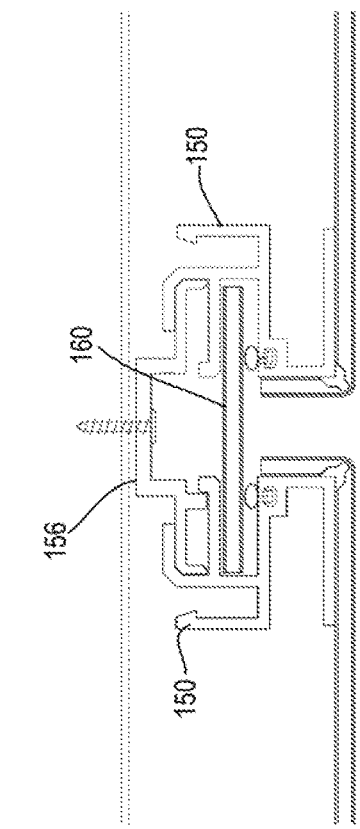
Fig. 24
Fig. 25
Fig. 26
Fig. 27

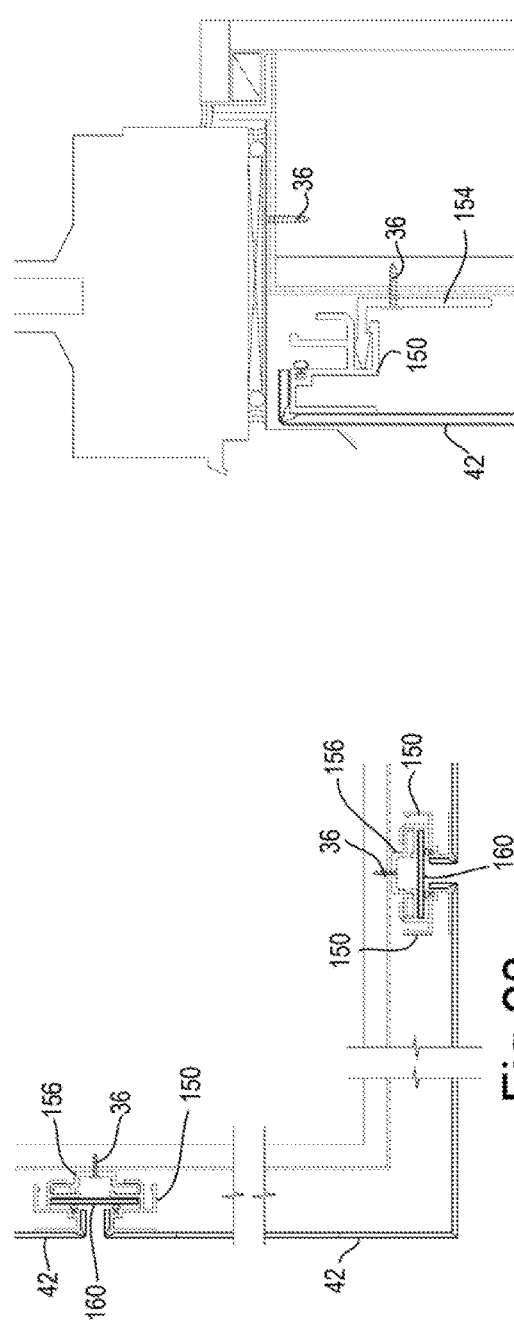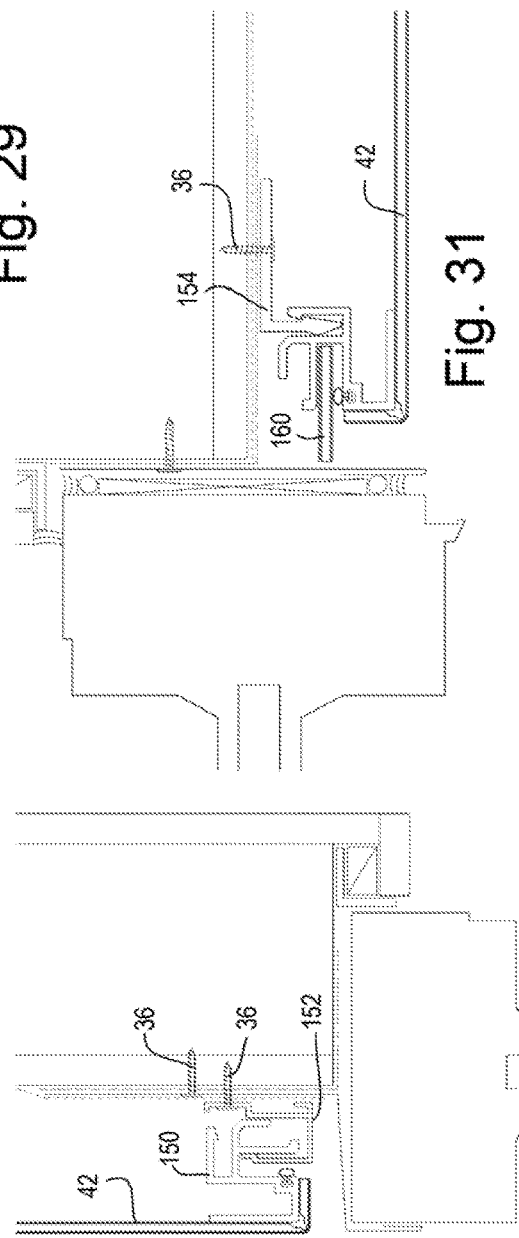

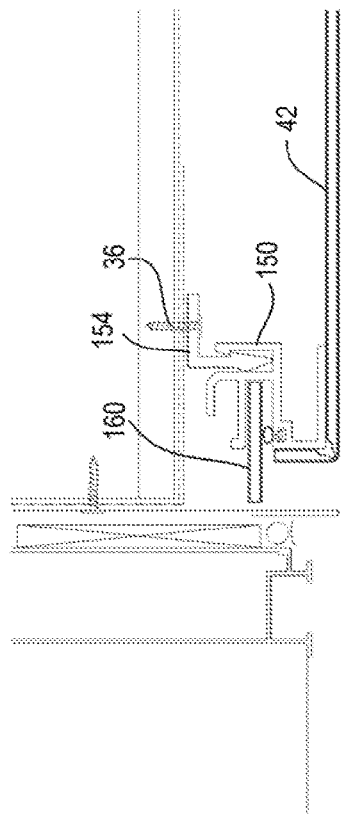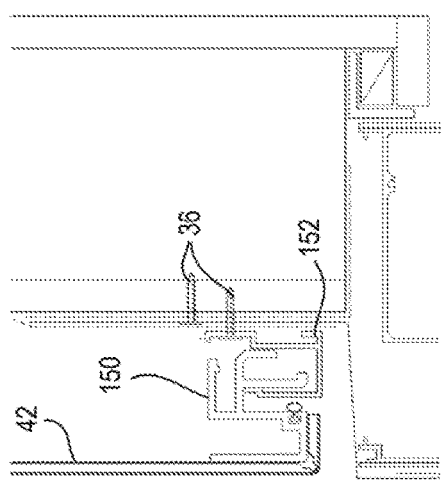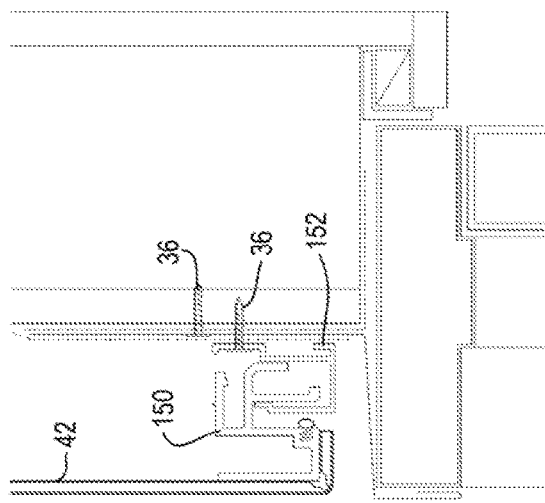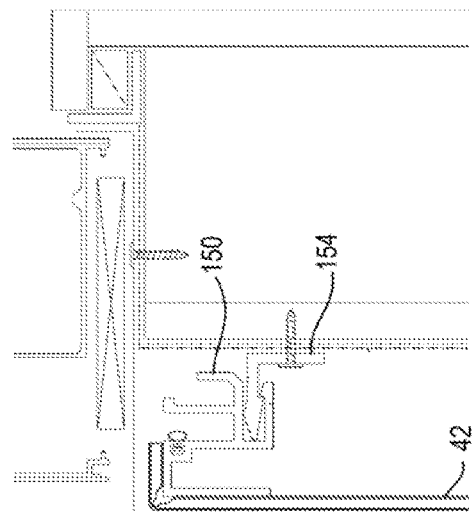

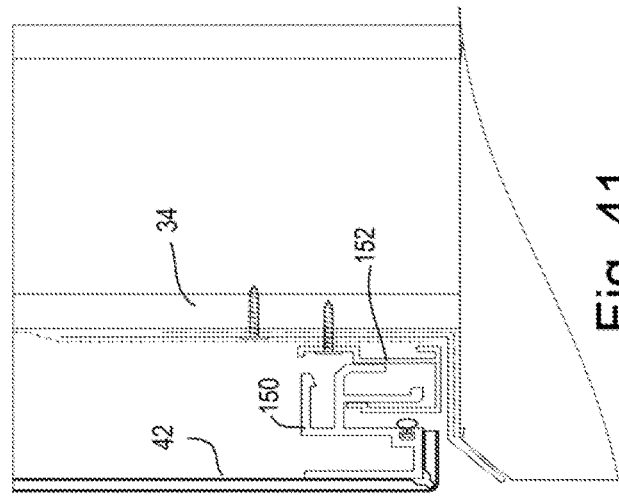
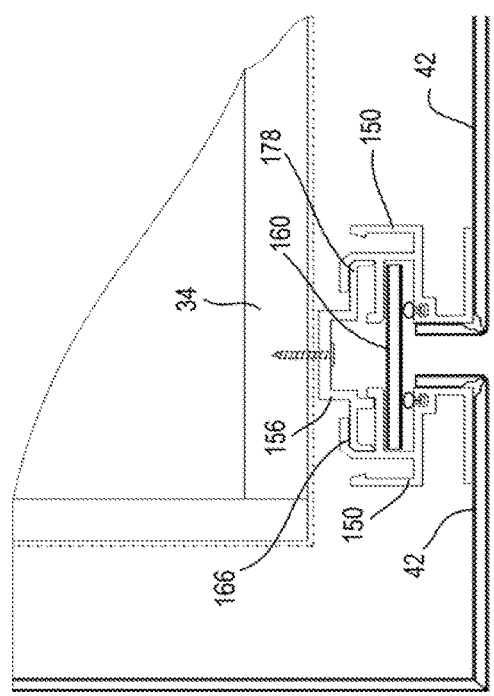
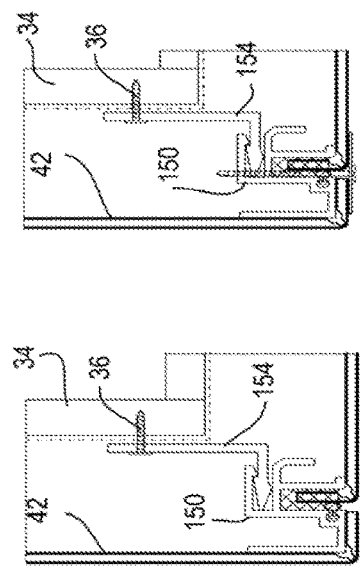
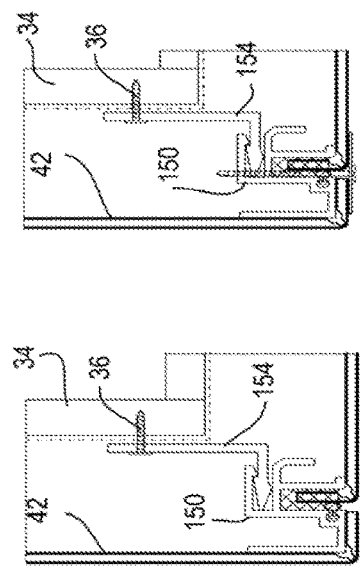
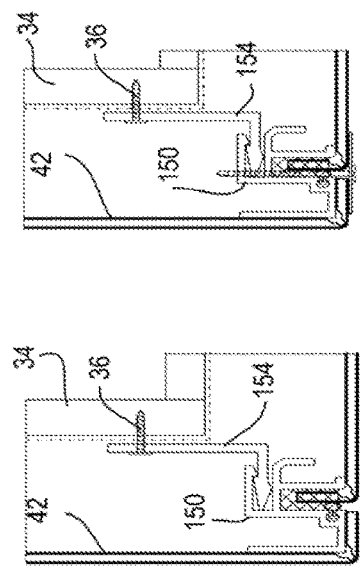
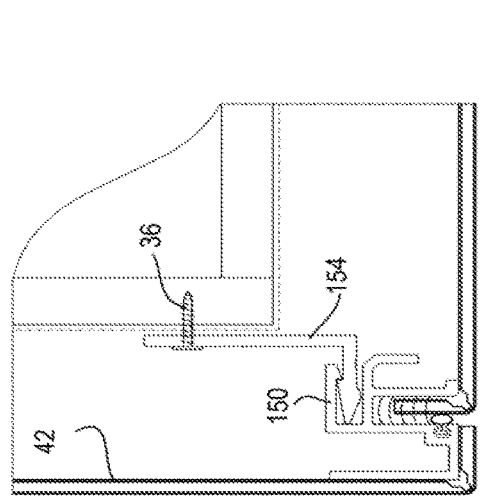

ARCHITECTURAL PANEL ASSEMBLY AND TOOLS

RELATED APPLICATIONS

This application is a continuation of U.S. Ser. No. 16/285,626 filed on Feb. 26, 2019.

Application U.S. Ser. No. 16/285,626 is a continuation of Ser. No. 15/284,193 filed on Oct. 3, 2016, now U.S. Pat. No. 10,213,905.

Application U.S. Ser. No. 15/284,193 is a divisional of U.S. Ser. No. 14/531,054 filed on Nov. 3, 2014, now U.S. Pat. No. 9,482,006.

Application U.S. Ser. No. 14/531,054 claims priority benefit of U.S. Ser. Nos. 62/038,262 filed on Aug. 16, 2014 and 61/899,132 filed on Nov. 1, 2013, and; each of these is incorporated herein by reference.

BACKGROUND OF THE DISCLOSURE

Field of the Disclosure

This application relates to the field of reveal style architectural panels along with tools and methods for making the same. Several examples of which are disclosed. Also disclosed is a tool/clamp for assembly thereof.

BRIEF DESCRIPTION OF THE SEVERAL VIEWS OF THE DRAWINGS

FIG. 1 is an end cutaway view of a prior art pair of reveal style panels and a mounting assembly.

FIG. 1a is an end cutaway view of another prior art pair of reveal style panels and a mounting assembly.

FIG. 2 is a cutaway isometric view of one example of the disclosed architectural panel assembly and tool.

FIG. 3 is an isometric view of one example of a tool (clamp) component shown in FIG. 2.

FIG. 24 is a cross sectional view of the region 24 shown in FIG. 46 showing a typical base attachment.

FIG. 25 is a cross sectional view of the region 25 shown in FIG. 46 showing a horizontal joint detail.

FIG. 26 is a cross sectional view of the region 26 shown in FIG. 46 showing a typical joint.

FIG. 27 is a cross sectional view of the region 27 shown in FIG. 46 showing a typical inside corner.

FIG. 28 is a cross sectional view of the region 28 shown in FIG. 46 showing a typical outside corner detail.

FIG. 29 is a cross sectional view of the region 29 shown in FIG. 46 showing a typical sill installation at a window.

FIG. 30 is a cross sectional view of the region 30 shown in FIG. 46 showing a typical head installation at window.

FIG. 31 is a cross sectional view of the region 31 shown in FIG. 46 showing a typical jamb installation at window.

FIG. 32 is a cross sectional view of the region 32 shown in FIG. 46 showing a typical head installation at a louver.

FIG. 33 is a cross sectional view of the region 33 shown in FIG. 46 showing a typical jamb installation at louver.

FIG. 34 is a cross sectional view of the region 34 shown in FIG. 46 showing a typical sill installation at louver.

FIG. 35 is a cross sectional view of the region 35 shown in FIG. 46 showing a typical head installation at a door.

FIG. 40 is a cross sectional view of the region 40 shown in FIG. 46 showing a typical wall-to-soffit transition installation.

FIG. 41 is a cross sectional view of the region 41 shown in FIG. 46 showing a typical base installation option.

FIG. 42 is a cross sectional view of the region 42 shown in FIG. 46 showing typical wall to soffit transition option.

FIG. 43 is a cross sectional view of the region 43 shown in FIG. 46 showing placement of caulking behind gasket.

FIG. 44 is a cross sectional view of the region 44 shown in FIG. 46 showing a step of pushing a composite panel into extrusion pocket. In this step the panel face and extrusion are typically flush.

FIG. 45 is a cross sectional view of the region 45 shown in FIG. 46 showing a step of using a self-tapping fastener (screw) though a plastic shim to hold the architectural panel assembly in position until the adhesive cures or dries.

DETAILED DESCRIPTION OF THE DISCLOSURE

Disclosed herein is a novel method for assembling a composite architectural face panel assembly in several examples. Several wall attachment clips, panel members, and frame extrusions are disclosed for different applications. The frame members may be extruded components, although they may be cast machined, or otherwise produced. Also disclosed is a novel clamp/tool to be used in assembly of such a composite architectural face panel.

Figure 10:
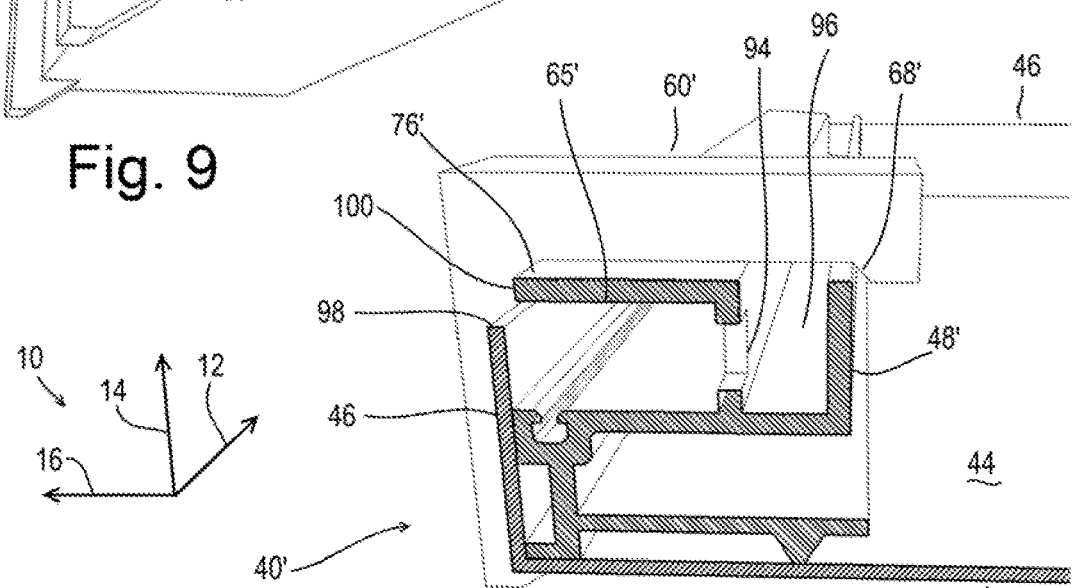
FIG. 10 is a sectional isometric view of a second example of the architectural panel assembly and tool shown in FIG. 2.

An axes system 10 is shown in FIGS. 2 and 10 including a transverse axis 12, lateral axis 16, and frontal axis 14 each orthogonal to the others.

Looking to FIG. 1 is shown a prior art composite (reveal style) panel generally including an outer panel 20 fixed to a frame 22 by way of a plurality of fasteners 24. Although the example in FIG. 1a is slightly different than that shown in FIG. 1, the same style of outer panel 20, frame 22 and fasteners 24 are utilized.

During construction of these prior art panels, an operator would generally bend the outer panel 20 to form a face panel 26 and a plurality of side panels 28. The outer panel 20 is then affixed to the frame 22 by way of the fasteners 24. The individual frame components 32 are often (tack) welded or otherwise fixed to each other. The combination of the outer panel 20 and frame components 32 form a panel assembly 30. As these panel assemblies 30 are often custom-fit to a particular installation, it is generally not convenient to fit the frames 22 within the outer panel 20 prior to construction. Once assembled, a structure frame 32 is attached to a building 34 generally by way of fasteners 36 and a support frame 38. The support frame 38 mounted to the building 34 and the panel assembly 30 hanging from the support frame 38.

In most common examples, the frame 22 has surfaces comprising mounting locations which allow for hidden (inner seam surface) fastening of the panel assembly 30 onto the building 34 via support frame 38 without visible (face surface) fasteners on the face panel 26. However, the fasteners 24 provided through this side panel 28 (not on the face panel 26) are generally visible and may provide a water conduit for rain, etc. to the detriment of the overall assembly.

Looking to FIG. 2 is a modified and improved panel assembly 40. As can be seen, the outer panel 42 comprises a face panel 44 and a plurality of side panels 46 (see FIG. 4 for another view of the panel assembly 40). Fitted within the outer panel 42 is a frame extrusion 48 having a perimeter side 92 adjacent and facing the side panels 46 and a face side 50 adjacent and facing the face panel 44. A volume of adhesive 54 may be used between the face side 50 and the outer panel 44. As one desired outcome of this assembly is to significantly avoid the outwardly visible fasteners 24 previously used; in one example adhesive 54 may be used between the face side 50 of the frame extrusion 48 and the inner surface of the face panel 44. A volume of adhesive 54 may be used to attach the face side 50 and face panel 44. FIG. 2 shows only a cutaway section of the outer panel 42 and the frame extrusion 48.

Figure 4:
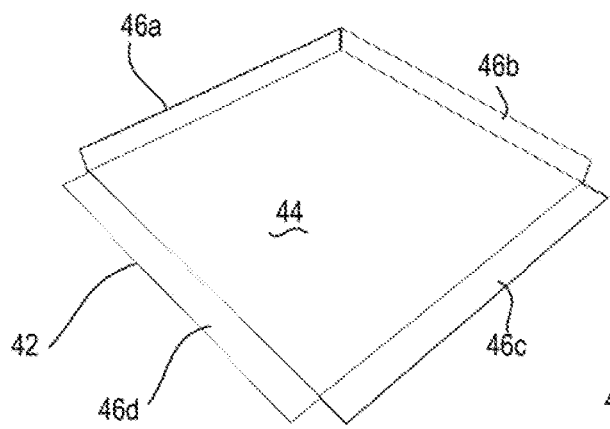
FIG. 4 is a top isometric view of a stage of production of the disclosed architectural panel assembly.
Figure 5:
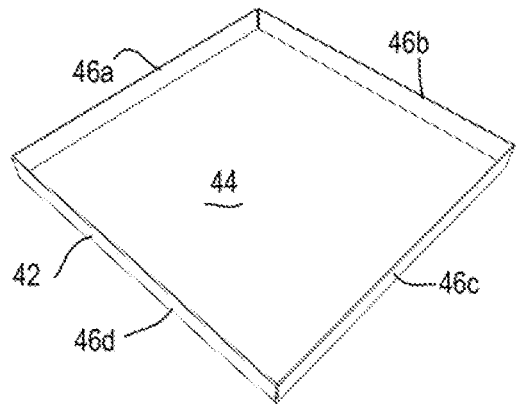
FIG. 5 is a top isometric view of a second stage of production of the disclosed architectural panel assembly.
Figure 6:
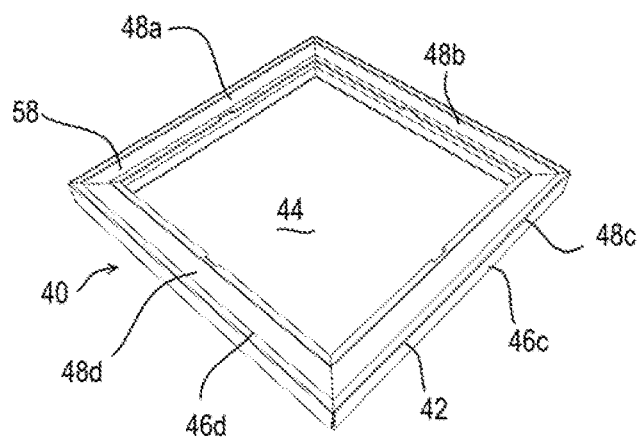
FIG. 6 is a top isometric view of a third stage of production of the disclosed architectural panel assembly.

Looking to FIG. 4, the face panel 44 can be seen in a stage of assembly where the side panels 46 (*a-d*) have been defined and the side panels 46a and 46b have been bent from a planar position (see side panels 46c and 46d) to a position substantially perpendicular to the face panel 44 thus forming an outer panel 42. FIG. 5 shows all of the side panels 46a-c in a bent position, substantially perpendicular to the face panel 44. In FIG. 6, an inner frame 58 comprising four frame extrusions 48a-c which have been cut and positioned inside the side panels 46 with optionally a layer of adhesive 54 to secure the outer panel 42 to the inner frame 58. Once in position, a specially designed clamp 60 or plurality of clamps 60 is used to temporarily hold the frame extrusions 48 in place on the outer panel 42. It is shown in FIG. 3 that each clamp 60 of this design comprises a face arm 62 which is generally perpendicular to a side arm 64. The face arm 62 having an inner surface 65 with a vertical (downward) protrusion 66 extending therefrom generally parallel to the side arm 64. The vertical protrusion 66 has an inner surface 68". Similarly, the side arm 64 has an inner surface 70 with a horizontal protrusion 72 extending therefrom with an inner surface 74 generally parallel to the face arm 62 thereupon.

Figure 9:
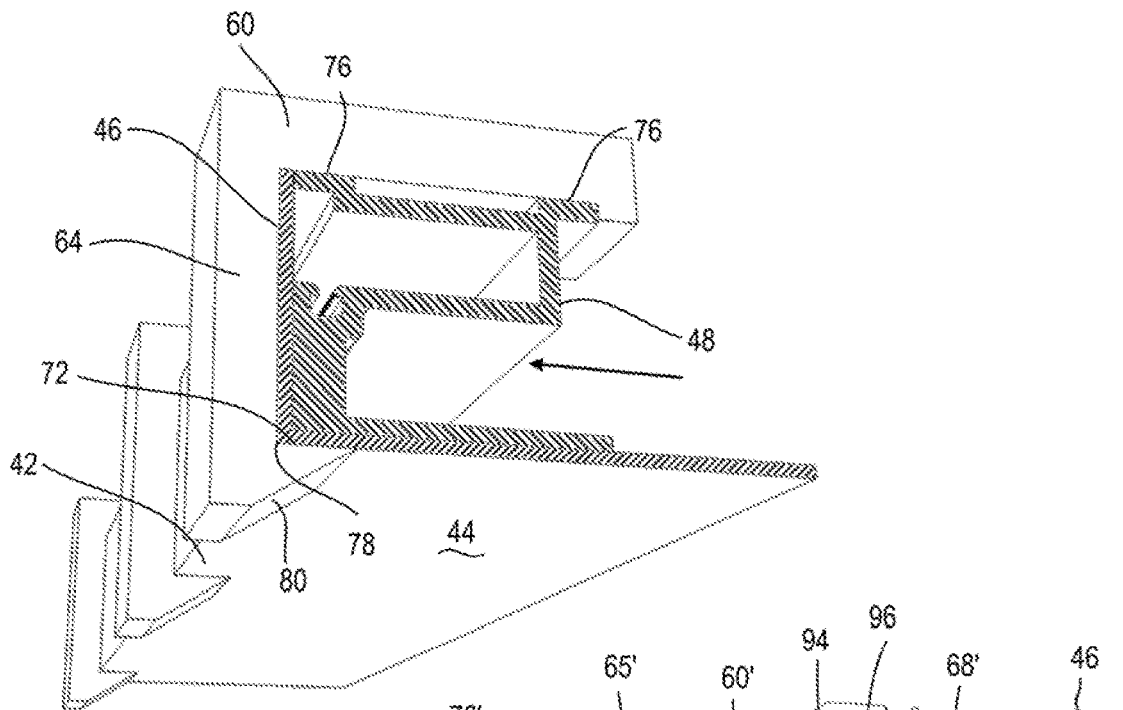
FIG. 9 is a bottom sectional isometric view of the architectural panel assembly and tool shown in FIG. 2.

In use as shown in FIG. 9, the inner surface 68 is positioned to engage an upper surface 76 of the frame extrusion 48 and the side arm 64 is rotated past a distant corner 78 of the outer panel 42. In the example shown, the side arm 64 comprises a tapered surface 80 to facilitate repositioning of the clamp 60 past the corner 78 in a snap fit.

In one form, the clamps 60 of each design are formed as a uniform construct body such as by extrusion followed by a step of cutting the extrusion along sides 82 and 84 to form the clamps 60 shown herein. The term uniform construct intended to mean a homogeneous structure which is cast, machined, extruded, or otherwise formed from a single structure such that all portions are fixed to each other. In one form, the clamps 60 of each design are formed of a relatively rigid polymer.

During assembly of a panel assembly 40 (outer panel 42 and frame extrusions 48), the clamps 60 hold the frame extrusions 48 in proper position relative to the corner 78 by flexing outward slightly along the side arm 64 (see FIG. 3) and or face arm 62 to form a force vector 86 pressing the frame extrusion 48 against the inner surface of the face panel 44 and against the inner surface of the side panel 46.

Figure 7:
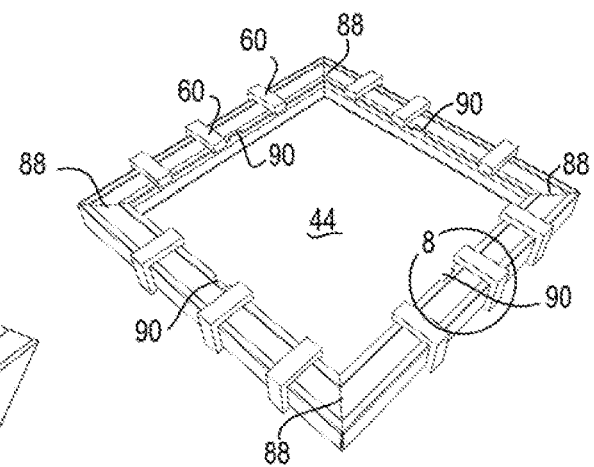
FIG. 7 is a top isometric view of a fourth stage of production of the disclosed architectural panel assembly and a tool (clamp) used to aid in assembly.

Once the frame extrusions are properly positioned, the independent frame extrusion components 48 may be connected by (tack) welding, brazing, adhering or other methods (such as at connecting surfaces 88 shown in FIG. 7). Such attachment processes can be accomplished once the clamps are positioned and held in place by the outer panel 42 and clamp 60.

In one form, the clamps 60 may be maintained in place while the panel assemblies 40 are prepared for storage or transport during a curing period of the adhesive 54 and during shipment or storage. Using prior art assembly techniques, once assembled the panel assemblies required additional padding so as to avoid scratching or damaging the face panels 44 and or side panels 46 during movement, shipping, and storage. In the architectural panel assembly disclosed herein, the clamps may provide this function during storage and shipping. One significant improvement is that the clamps 60 in most designs herein have no moving parts as the term is commonly used.

Testing of the disclosed architectural panel assembly has shown that it may take up to 48 hours or more for the adhesive to cure. This time delay increases the advantages of allowing the clamps 60 to remain in place while the panel assemblies are assembled and stored, even in a vertical orientation. Prior art examples of constructing these panel assemblies without the fasteners 24 involved maintaining the frame extrusions 48 in a proper relative position by gravity which is not advantageous as these panel assemblies must be held in a planar position for the full cure time of the adhesive. This prior art process without the disclosed clamps requires significant floor space and or workspace during the curing process. Currently, the clamps 60 are well-suited to temporarily perform the function of the fasteners 24 while the adhesive cures or dries, as well as optionally perform the function of the prior art padding used in shipping, movement, and storage.

Figure 8:
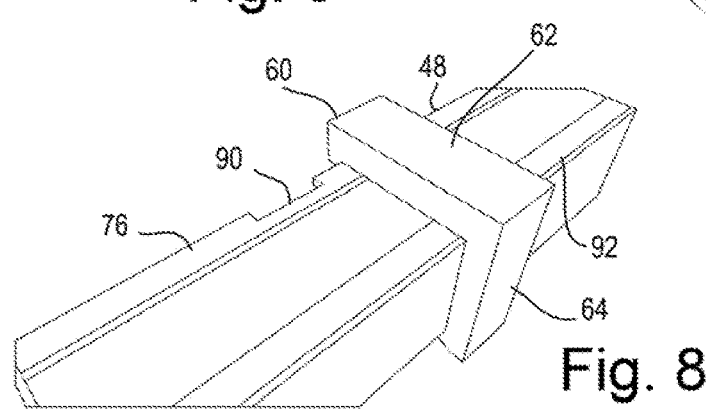
FIG. 8 is a detail enlarged view of a region 8 of FIG. 7.

To remove the clamps 60, the clamps 60 may be cut off, or potentially may be forcibly removed. However; either of these methods may be detrimental to the face panel 44 and/or side panels 46. It is therefore provided in one example, to provide cutaway portions 90 (FIG. 8) in the surfaces 76 of the frame extrusions 48 such that the clamps 60 may be slid (slid: to move along in continuous contact with a smooth or slippery surface) laterally to overlap the cutaway portion 90 facilitating easy removal of the clamp 60 from the frame assembly 40.

Testing has shown that when the clamps 60 are formed of a polymer material, such as for example ultrahigh molecular weight (UHMW) polymers, or plastics such as polyethylene; sliding removal of the clamps 60 in this way does not damage the face panel 44 nor side panel 46 and is easily accomplished.

As the face panel 44 and/or side panel 46 may be an aluminum composite material with a polymer (polyurethane) core; the overall assembly is quite light, especially when the fasteners 24 are eliminated from the construction.

Once the panel assembly 40 is properly constructed, it may be stored, shipped, and attached to a building 34 by way of support frames 38 previously disclosed. In one form, the cutaway portions 90 may be used to attach the assemblies 40 to the support frames 38 in a similar manner to that disclosed relative to removal of the clamps 60.

Looking to FIG. 10 is shown a second example of a frame extrusion 48' and a second example of a clamp. In this example the same numerical identifiers will be used as the first example with a single quote mark "'" indicator. For example; the clamp shown in FIG. 3 is labeled 60 whereas the modified clamp shown in FIG. 10-14 is labeled 60'. This labeling system should assist in describing the examples without unnecessary repetition.

Still looking to FIG. 10 it can be understood that this example shows several modifications to the previous example which can be used independent of or combined with the example shown in FIG. 9. For example, the frame extrusion 48' shown in FIG. 10 includes surfaces defining at least one vent/weep conduit 94 in one or more frame extrusions 48'. This vent/weep conduit 94 allows for water passage through at least a portion of the frame extrusion 48'. Generally, the face panel 44 is in a vertical orientation when installed and it is less than desirable neither for water to accumulate either between the outer panel 42 and the building 34 nor within any portion of the frame extrusion 48'. Thus the conduit 94 allows for water passage through the panel assembly 40' by entering one of the conduits 94 in the upper or side frame extrusion components and then exiting through a conduit 94 in the vertically lower or side frame extrusion components after installation on a wall. In one form, a weep channel 96 may facilitate water conduction around the frame components 48'.

In this example, referring to the axes system 10 previously described, the frontal edge 98 of the side panel 46 does not extend frontally to the surface 76' of the frame extrusion 48'. This arrangement will result in a gap of at least the offset distance between the upper edge 98 and the surface 76' when the panel assembly is installed. Assuming that the surface 76' is closely adjacent or contacting the outer surface of the building 34 when the panel assembly is installed. This gap may allow water and wind to enter inner components of the frame extension 48' which may necessitate the conduit 94. Testing has also shown that allowing for wind passage around the edge 98 and through the panel assembly 40'. This gap also reduces wind shear effects of the panel assembly 40' which allows for installations in higher wind applications than previously possible.

Referring to the axes system previously described, in this example a lateral edge 100 of the frame extrusion 48' does not extend laterally 16 outward to the side panel 46. This arrangement results in an additional (lateral 16) offset. These two offsets disclosed above are accounted for in the clamp 60' by way of a detent 102. The detent 102 in this example has a frontal surface 104 facing the inner surface 74 of the horizontal protrusion 72 and a lateral surface 106 facing the inner surface 68' of the vertical protrusion 66' of the face arm 62. The frontal surface 104 contacts the front edge 98 of the frame extrusion 48'. The lateral surface 106 contacts the surface 76' of the frame extrusion 48'.

Figure 11:
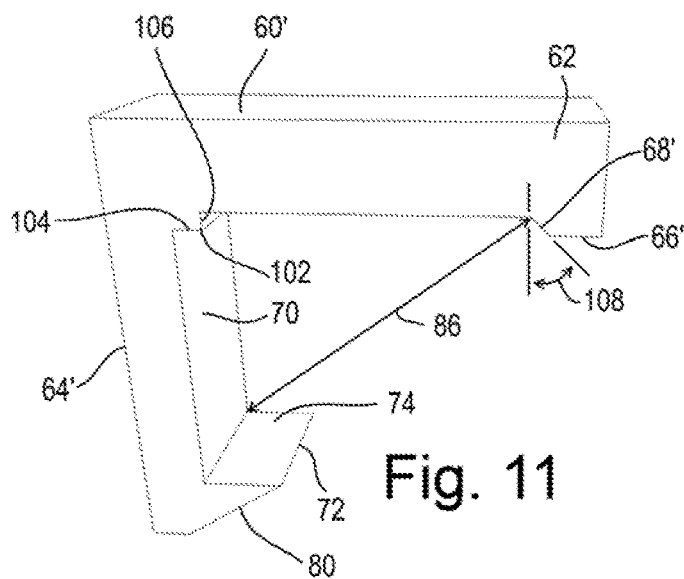
FIG. 11 is a side isometric view of another example of the tool (clamp) shown in FIG. 3.

Due in part to the shapes and dimensions of the frame protrusion 48' as can be seen in FIG. 10, the inner surface 68' may be angled at a relative angle 108 as more clearly shown in FIG. 11 to the inner surface 70 of the side arm 64. In one example this angle may be between 20° and 70°. In one example this angle may be substantially 45°.

Figure 12:
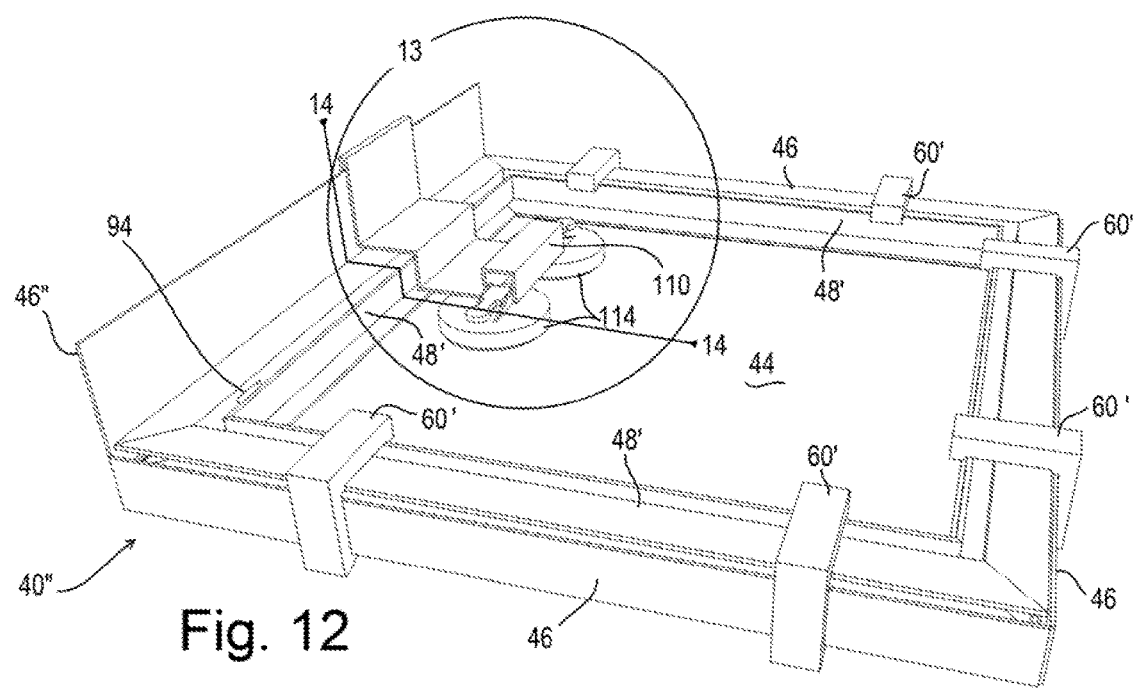
FIG. 12 is a top isometric view of a stage of production of another example of the disclosed architectural panel assembly and tool.
Figure 13:
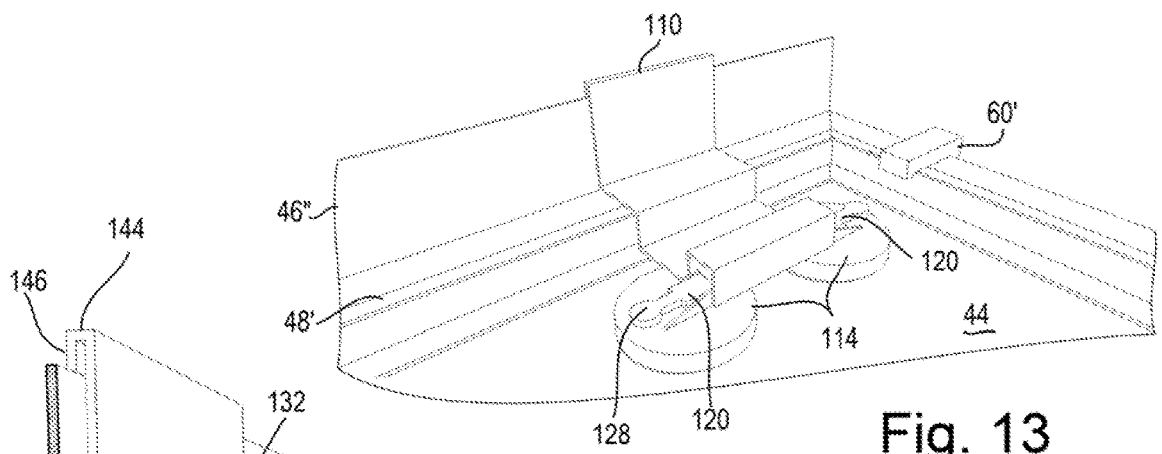
FIG. 13 is an enlarged view of one region 13 of FIG. 12.
Figure 14:
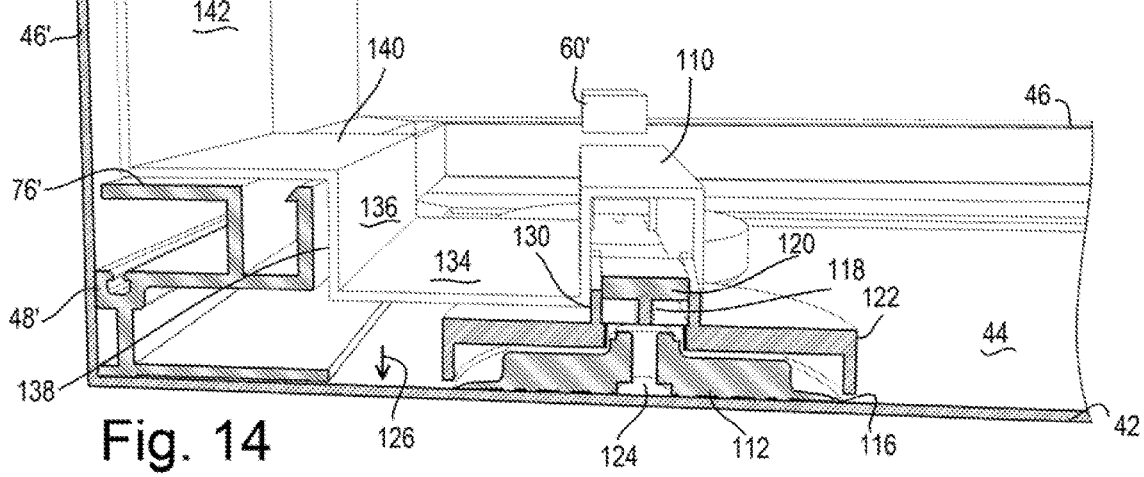
FIG. 14 is a cutaway view of a region of FIG. 12 taken along line 14-14.

Looking to FIG. 12 is shown in assembly method and a panel assembly with a slight modification to that shown in the previous Figs. To distinguish components of this example which are similar but different from those shown in the previous examples will use the same numeric label with a double quote """ indicator. For example, in example shown in FIG. 12 three of the side panels 46 are the same as/of a frontal height equivalent to that shown in FIG. 10 relative to the frame extrusion 48'. One of the side panels is substantially extended in a frontal direction 14 and is thus labeled 46". The clamps 60' used to connect the frame extensions 48' to the shorter side panels 46 will not be functional in this configuration with the frontally extended side panel 46". Thus, to enable easy construction of this or other examples of the architectural panel assembly, a suction cup clamp assembly 110 is disclosed. The suction clamp assembly 110 can be seen in the cross-sectional view of FIG. 14 system with several interoperating components. For example, in this example the suction clamp assembly 110 comprises a plurality of suction cup assemblies 114. Each suction cup assembly includes a suction cup 112 with a perimeter edge 116 forming a suction seal to the inner surface of the face panel number 44. Each suction cup assembly may also comprise a rigid housing 122 with an actuator assembly. As an actuator rod 118 is moved by way of an actuator 120 away from the panel 44, the rigid housing 122 will be drawn toward the suction cup 112 creating a vacuum in the gap 124 between the suction cup 112 and the face panel 44 provided that there is an airtight seal at the perimeter edge 116. This action will draw/move the rigid housing 122 frontally downward 126 along with any components rigidly attached thereto. Looking to FIG. 13 it can be understood that each actuator 120 may have an engagement surface 128 thereon to facilitate the user exerting (rotational) force upon the actuator 120. In this example, the actuator rod 118 slides linearly in a frontal direction 14 and the actuator 120 pivots about a transversely aligned pivot through a plurality of extensions 130 from the rigid housing 122.

In the example shown, a bracket 132 is affixed to the rigid housing(s) to align and temporarily secure the frame extrusion 48' the side panel 46' so as to hold the frame extrusion 48' in place while the adhesive between the frame extrusions 48' and panel 44 cures. In this example, the bracket 132 may be fixed to the rigid housing(s) 122 such as by way of (removable) mechanical fasteners such as screws, or other less removable methods such as, welding, brazing, or adhesives. This example shown in FIG. 12-14 has a first lateral extension 134 extending therefrom toward the frame extrusion 48'. The bracket 132 also has a first vertical extension 136 extending from the first lateral extension 134 in contact with and pressing against the frame extrusion 48' at contact surface 138. In this example the bracket 132 also has a second lateral extension 140 which contacts the surface 76'. As the actuator 120 is utilized, the rigid housing 122 along with the bracket 132 repositions frontally inward 126. This movement presses the second lateral extension 140 against the surface 76' maintaining the frame extrusion 48' against the outer panel 42 until the adhesive is sufficiently cured to safely remove the suction clamp assembly 110 without movement of the frame extrusion 48' relative to the outer panel. In addition, the bracket 132 has a second vertical extension 142 adjacent the side panel 46' with a third lateral extension 144 extending therefrom and a third vertical extension 146 extending in a frontally inward correction 126 and against the outer perimeter surface of the side panel 46'.

Figure 46:
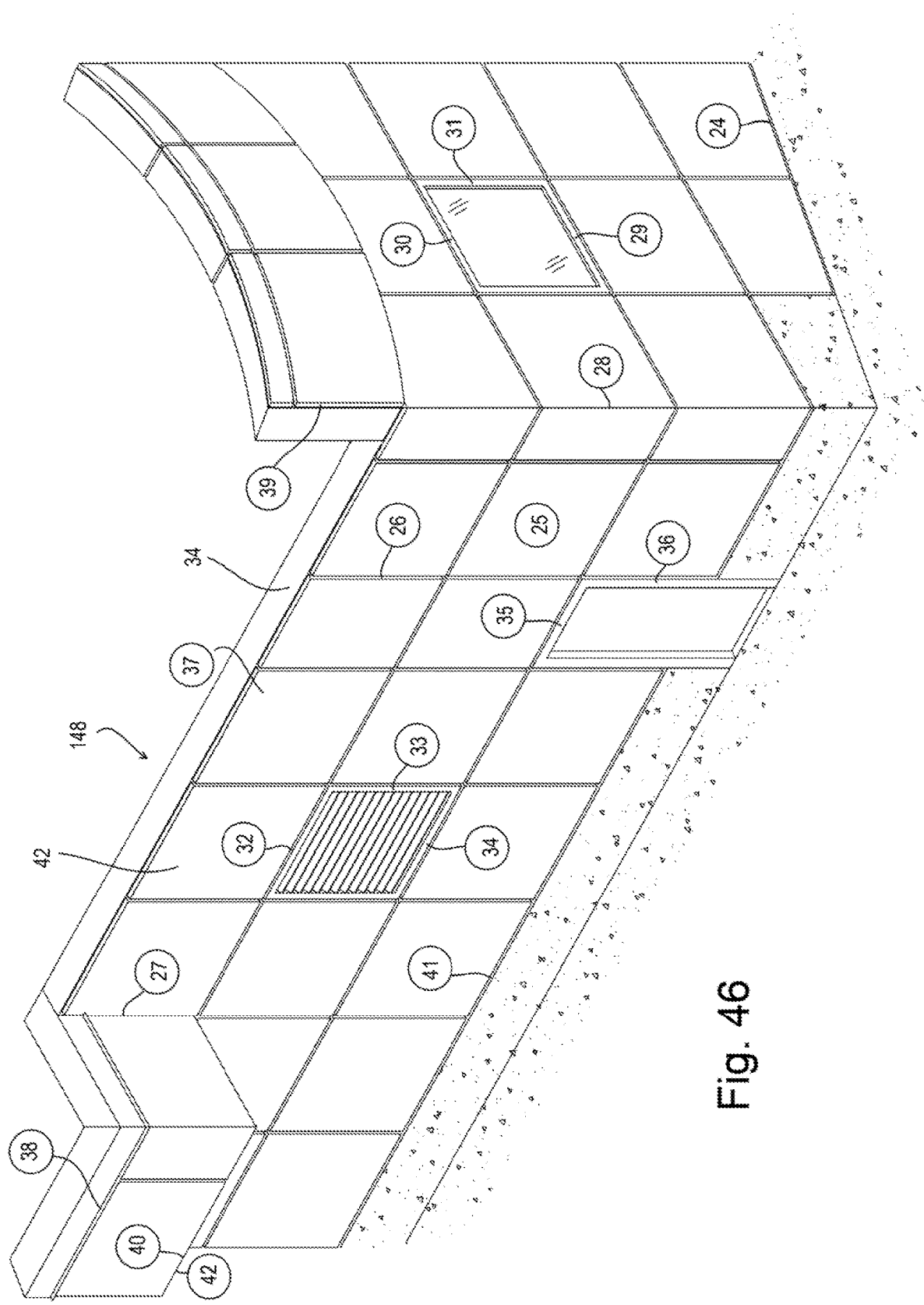
FIG. 46 is a stylized example of several installed examples of the claimed apparatus.
Figure 47:
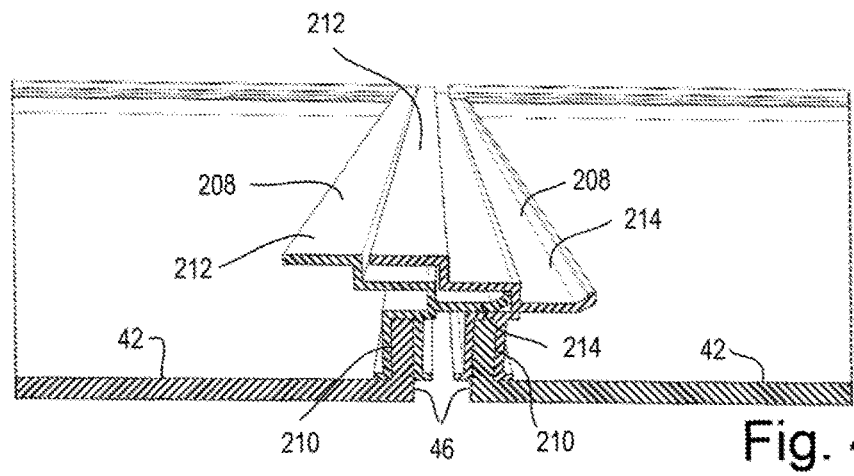
FIG. 47 is a cutaway end view of an assembled pair of panel assemblies.

Looking to FIG. 46 is shown a highly stylized building 34 having a panel 42 attached thereto. In this stylized example 148, several different inside corners, outside corners, doorways, windows, louvers, etc. are shown. To follow below is a description of several different frame extrusions and attachment devices which may be utilized to satisfy all the needs of the customer using the disclosed panels for buildings (structures) including the building 34 shown.

In FIG. 24 is shown a cross sectional view of the region 24 shown in FIG. 46 showing a typical attachment of a panel assembly to a base component starter track.

FIG. 25 is a cross sectional view of the region 25 shown in FIG. 46 showing a horizontal joint detail.

FIG. 26 is a cross sectional view of the region 26 shown in FIG. 46 showing a typical vertical joint.

FIG. 27 is a cross sectional view of the region 27 shown in FIG. 46 showing a typical inside corner.

FIG. 28 is a cross sectional view of the region 28 shown in FIG. 46 showing a typical outside corner detail.

FIG. 29 is a cross sectional view of the region 29 shown in FIG. 46 showing a typical sill installation at a window.

FIG. 30 is a cross sectional view of the region 30 shown in FIG. 46 showing a typical head installation at window.

FIG. 31 is a cross sectional view of the region 31 shown in FIG. 46 showing a typical jamb installation at window.

FIG. 32 is a cross sectional view of the region 32 shown in FIG. 46 showing a typical head installation at a louver.

FIG. 33 is a cross sectional view of the region 33 shown in FIG. 46 showing a typical jamb installation at louver.

FIG. 34 is a cross sectional view of the region 34 shown in FIG. 46 showing a typical sill installation at louver.

FIG. 35 is a cross sectional view of the region 35 shown in FIG. 46 showing a typical head installation at a door.

Figure 36:
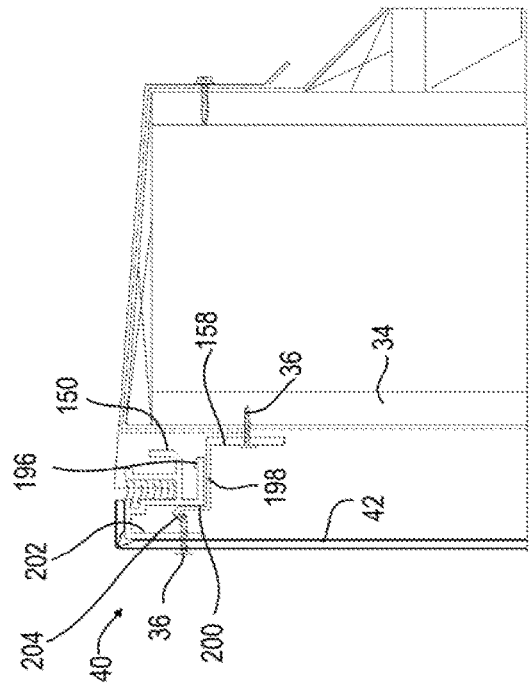
FIG. 36 is a cross sectional view of the region 36 shown in FIG. 46 showing a typical jamb installation at a door.

FIG. 36 is a cross sectional view of the region 36 shown in FIG. 46 showing a typical jamb installation at a door.

Figure 37:
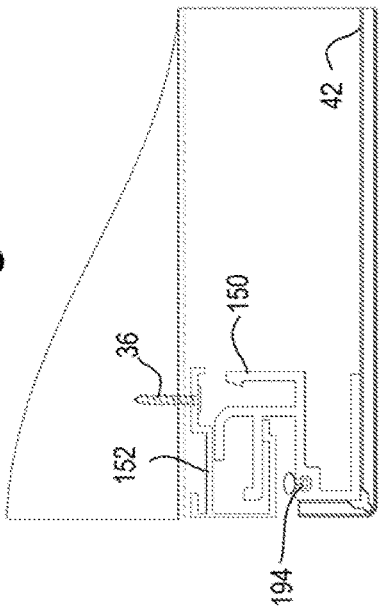
FIG. 37 is a cross sectional view of the region 37 shown in FIG. 46 showing a typical parapet coping installation option.

FIG. 37 is a cross sectional view of the region 37 shown in FIG. 46 showing a typical parapet coping installation option.

Figure 38:
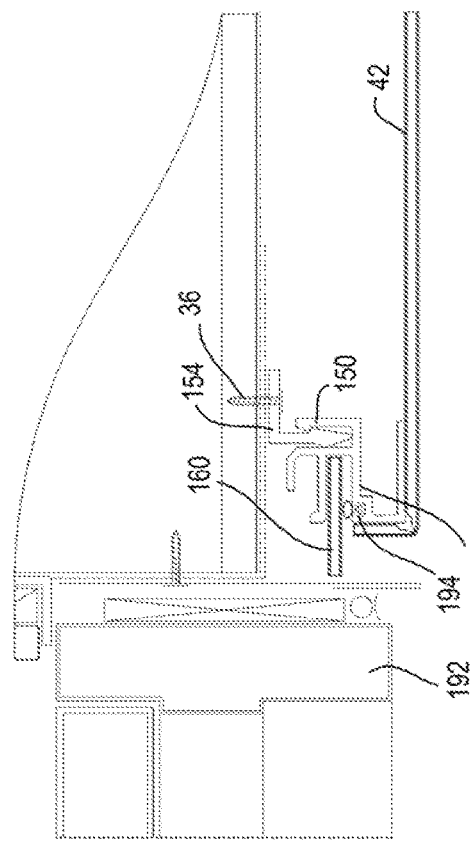
FIG. 38 is a cross sectional view of the region 38 shown in FIG. 46 showing a typical parapet coping installation option.

FIG. 38 is a cross sectional view of the region 38 shown in FIG. 46 showing a typical parapet coping installation option.

Figure 39:
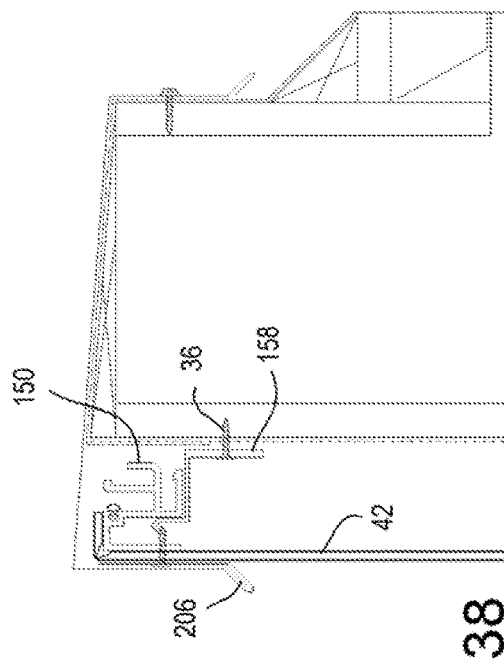
FIG. 39 is a cross sectional view of the region 39 shown in FIG. 46 showing an end wall installation.

FIG. 39 is a cross sectional view of the region 39 shown in FIG. 46 showing an end wall installation.

FIG. 40 is a cross sectional view of the region 40 shown in FIG. 46 showing a typical wall-to-soffit transition installation.

FIG. 41 is a cross sectional view of the region 41 shown in FIG. 46 showing a typical base installation option.

FIG. 42 is a cross sectional view of the region 42 shown in FIG. 46 showing typical wall to soffit transition option.

FIG. 43 is a cross sectional view of the region 43 shown in FIG. 46 showing placement of caulking behind gasket.

FIG. 44 is a cross sectional view of the region 44 shown in FIG. 46 showing a step of pushing a composite panel into extrusion pocket. In this step the panel face and extrusion are typically flush.

Figure 15:
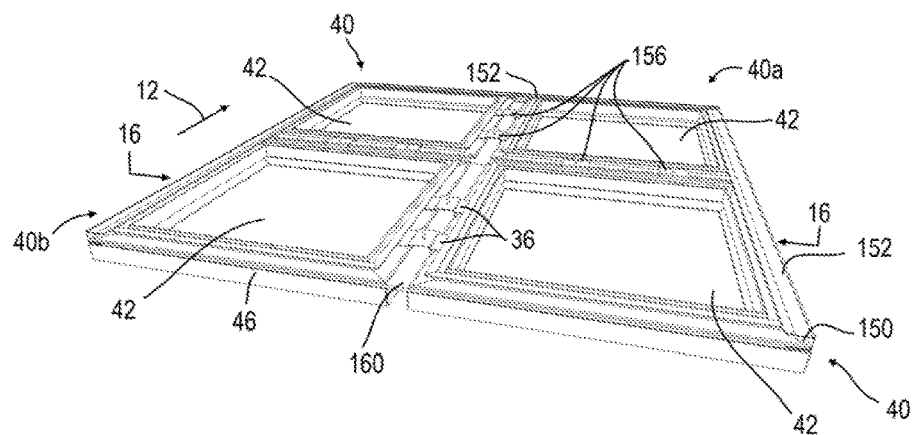
FIG. 15 is a rear isometric view of a set of 4 architectural panel assemblies as they may be attached to a wall (not shown) in one example.

FIG. 45 is a cross sectional view of the region 45 shown in FIG. 46 showing a step of using a self-tapping fastener (screw) though a plastic shim to hold the architectural panel assembly in position until the adhesive cures or dries. In FIG. 15, several architectural panels 20 are shown attached to a slightly different framework comprised of frame extrusions 150 which are attached to the building 34 by way of a starter track 152 or other attachments such as angle spear clip 154, field clip 156, or zee clip 158 (FIG. 27). A spline 160 may be placed between frame panel components.

Figure 16:
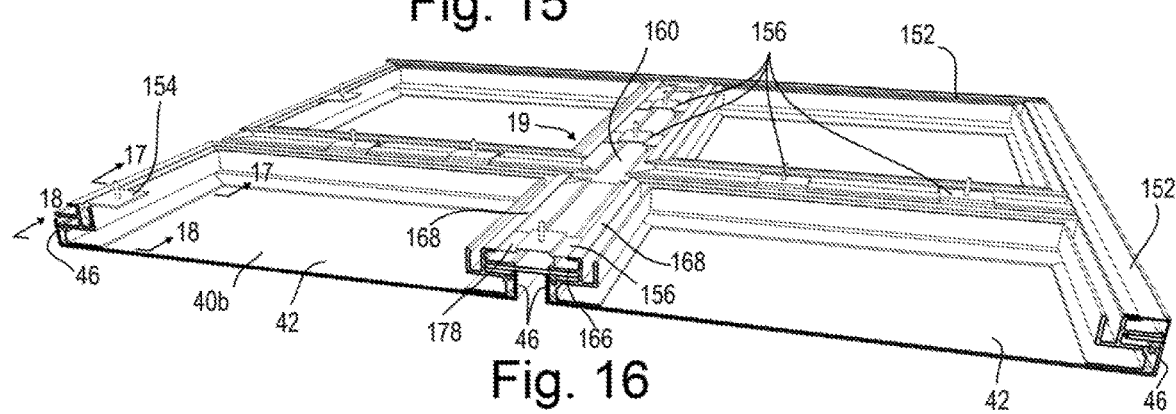
FIG. 16 is a cutaway view of the example shown in FIG. 15 taken along line 16-16.
Figure 17:
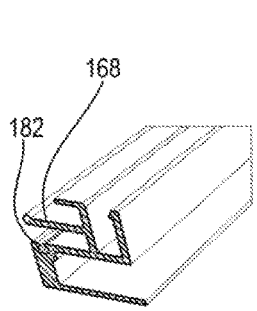
FIG. 17 is a cutaway view of one example of the frame extrusion taken along line 17-17.

It can be appreciated that as shown, the assembly of FIG. 16 comprises four panel assemblies 40. In FIG. 46 is shown an assembly of approximately 38 panel assemblies. Returning to FIG. 15, it can be seen how the starter track 152 may be attached by way of fasteners 36 to a building 34. Normally, the starter track 152 is attached to the lowermost portion of the building 34. Another length of starter track 152 may be attached at a transverse end of the building. During installation, a protrusion 162 of the frame extrusion 150 is fitted into surfaces defining a channel 164 of the starter track 152. This is also shown in FIG. 41. The first panel assembly 40a is then slid within the channel 164 until the adjacent starter track 152 is engaged in the same manner. This installation step holds the first panel assembly 40a in position while the other sides of the panel assembly 40a are attached to the building 34.

Figure 20:
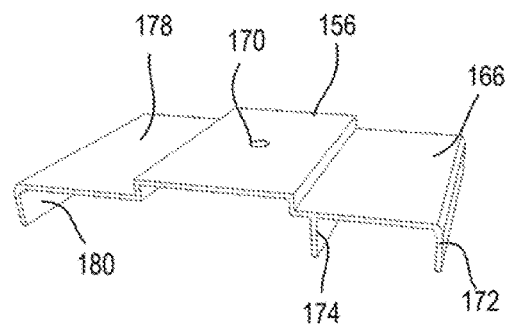
FIG. 20 is an isometric view of a filed clip component shown in FIG. 15.

In the assembly shown in FIG. 15 a plurality of field clips 156 have been attached to the first panel assembly 40a for attachment to an adjacent panel assembly. As can be seen in FIG. 20, the field clips 156 each have a first side 166 which can be slid into surfaces defining a lateral channel 168 in the frame extrusion 150 prior to installation into the starter track 152. Using fasteners 36 (see FIG. 15) positioned through surfaces defining voids 170, the field clips 156 are fixed to the building. In this way, all four sides of the panel assembly 40a are attached to the building. This assembly method can be repeated until the desired wall coverage is achieved.

As can be seen in FIG. 20, the first side of the field clip 156 has an outer tang 172 and an inner tang 174; although these tangs 172/174 could be formed as a unitary structure.

The inner tang 174 in one example engages a detent 176 in the channel 168 in such a way as to allow easy insertion, removal and sliding along the channel 168. This installation method generally holds the field clip 156 within the channel 168 during installation to the building as shown in FIGS. 42, 43, 44, 45. The second side 178 of the field clip 156 comprises an outer tang 180 and may not include the inner tang 174. This absence of the inner tang 174 allows a user to attach another panel assembly 40b by engaging the channel 168 on to the second side 178 after the field clip 156 is attached to the wall and then pivoting the panel assembly 40b into position on the building 34 either with another field clip 156 or other assemblies.

Figure 19:
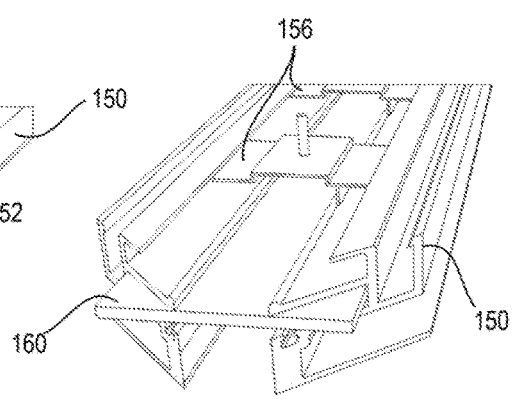
FIG. 19 is an end view of internal components of the example shown in FIG. 15 at region 19 with several components removed to better illustrate the remaining components.
Figure 21:
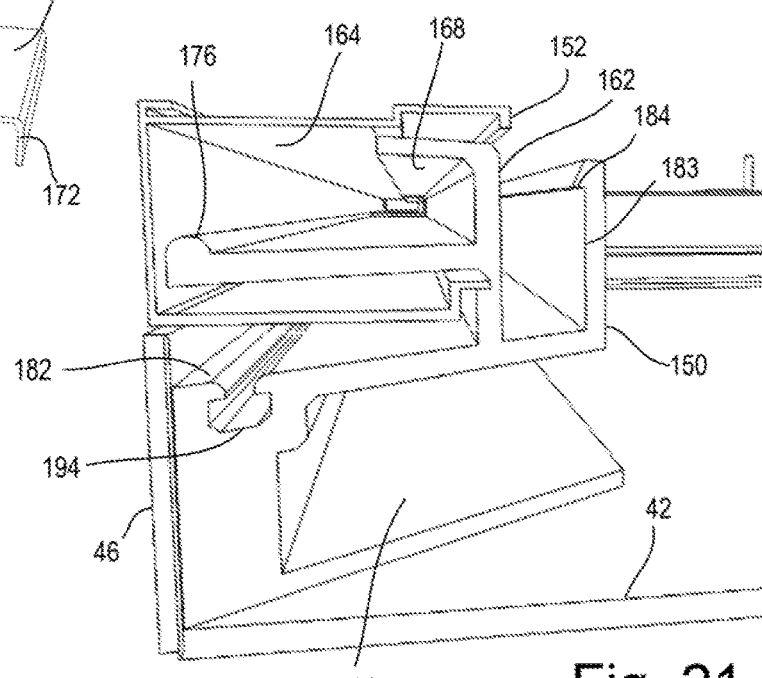
FIG. 21 is an end view of internal components of the example shown in FIG. 15 with a side panel removed to better illustrate the remaining components.
Figure 22:
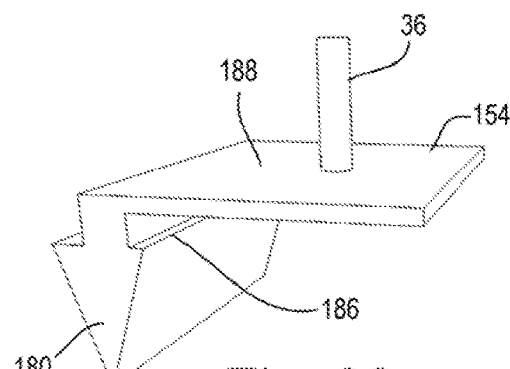
FIG. 22 shows one example of an angle spear component as shown in FIG. 15.

Looking to FIG. 19 and FIG. 40, it can be seen how once installed, a spline 160 generally comprising a flat stock length of material may be fitted into a spline receiving channel 182 (see FIG. 21). So as to further reinforce, provided whether resistance, and to improve aesthetic appeal. In FIG. 36 an installation is shown wherein the spline 160 is fitted between the frame extrusion 150 and a door jamb 192 again to improve aesthetic appeal as well as to keep a rein and other weather elements out of the assembly. In this example, a malleable seal 194 is provided in a seal receiver 194 of the spline 182.

Figure 18:
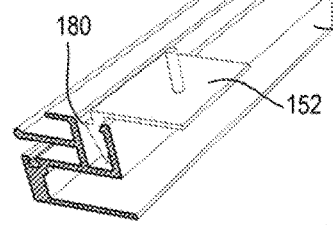
FIG. 18 is a view of internal components of the example shown in FIG. 15 taken along line 18-18.

In one example, such as when the end of the wall is reached, it may not be convenient to utilize the field clip's 156. Thus, spear clips 154 may be utilized. As seen in FIG. 18, these spear clips 154 may be attached to the building by way of fasteners 36 at the correct position so that as the panel assembly 40b is rotated into position, the spear point 180 is positioned into spear receiving channel 183 past a detent 184. Once the detent 186 of the spear 180 passes the detent 184, the panel assembly 40b snaps into position. In this position, the mounting surface 188 and fasteners 136 are hidden from view by the panel assembly 40b. As understood to one of ordinary skill in the art, the detent 184 may also be provided on the protrusion portion 162.

Figure 23:
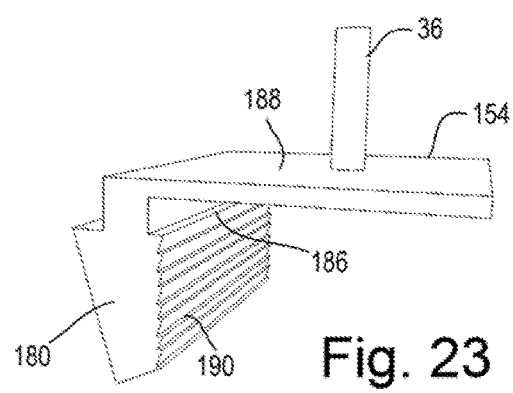
FIG. 23 shows another example of the angle spear component.

It may be desired to allow for different positioning of the panel assembly 40b relative to the spear point 180. Thus, as shown in FIG. 23 rather than a single detent 186 it may be desired to have a serrated surface 190 which engages the detent 184 at various positions, including at the detent 186.

Looking to FIG. 37 is an installation utilizing the Z-clip 158. In this attachment, the Z clip 158 is attached to the building 34 by way of fastener 36. The panel assembly 40 is then attached to the Z-clip such that a protrusion 196 of the frame extrusion 150 rests upon a surface 198 of the Z-clip. In addition, a protrusion 200 of the Z-clip fits within a channel 202 of the frame extrusion 150. A fastener 36 may then be screwed through the outer panel 42 and engages a protrusion 204 of the Z-clip 158 to keep the panel assembly 40 and the correct position. Looking then to FIG. 38, it can be seen that flashing 206 may then be fitted over this assembly so as to keep water from entering at the fastener 36 which otherwise may provide water entry through the outer panel 42. FIG. 27 also shows an installation utilizing the Z-clip 158.

Figure 48:
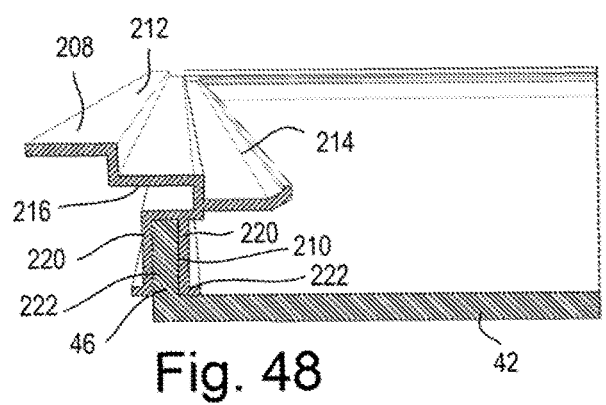
FIG. 48 is a cutaway end view of one end of an assembled panel assembly.
Figure 49:
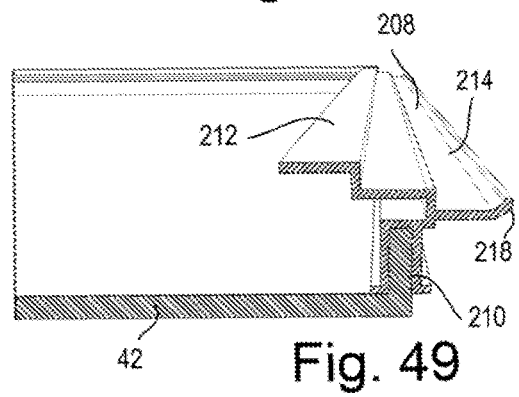
FIG. 49 is a cutaway end view of the opposing end of an assembled panel assembly from that shown in FIG. 48.
Figure 50:
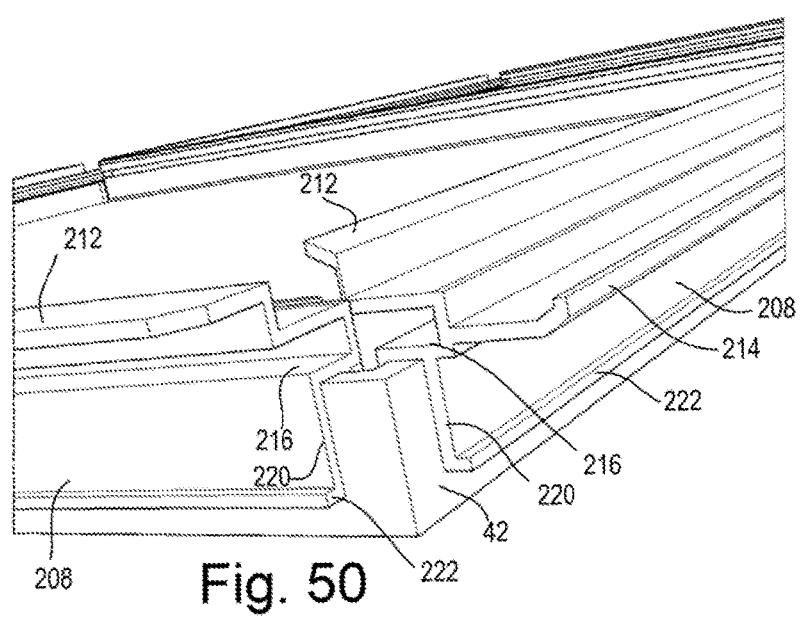
FIG. 50 is a corner view of and assembled panel assembly.

Looking to FIG. 47-50 is shown a reversible frame extrusion 208 which comprises a channel 210 into which may be disposed a volume of adhesive upon which the frame extrusion 208 is attached to the side panel 46 of an outer panel 42. The reversible frame extrusion 208 of this example comprises a wall attachment protrusion 212 and a channel engagement protrusion 214 both extending orthogonal to the channel 210 in opposing directions. During assembly, the reversible frame extrusions 208 are attached in reversed orientations on opposing sides of the outer panel number 42 for example, FIG. 48 shows the wall attachment protrusion 212 extending outward of the outer panel 42. In this position, a user may attach fasteners through the wall attachment protrusion 212 to directly connect this reversible frame extrusion 208 to the building. Looking to FIG. 49 is shown the opposing side of the outer panel 42 wherein the channel engagement protrusion 214 extends outward of the outer panel 42. This allows attachment of this side of the panel assembly to an adjacent panel assembly at a receiving channel 216.

The starter track 152 and similar apparatuses of previous examples may be utilized in combination with this example.

This the understood that in some examples, such as the bottommost and uppermost or leftmost and rightmost panels of a wall installation may utilize panel assemblies wherein the wall attachment portion 208.

This example omits the need for attachment of an inner frame assembly to the building wall prior to installation of the panel assemblies.

Figure 51:
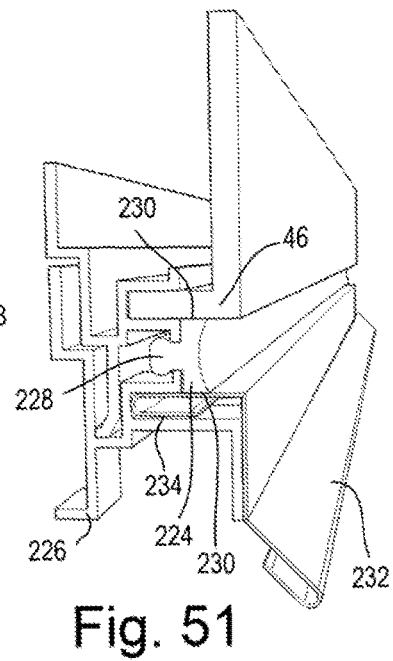
FIG. 51 is a cutaway end view of an assembled panel assembly and seal.

Looking to FIG. 48, can be understood that the bottom portion of the channel 210 is formed by a plurality of protrusions 220 each ending in a flared portion 222. Looking to FIG. 51, it can be seen that a malleable seal may be fitted between adjacent panel assemblies or in this instance between a panel assembly and a starter track 226 of a slightly different construction the not previously shown. The malleable seal 224 may be formed of rubber, silicone, closed cell foam or similar constructions so as to compress as a bulbous portion 228 of the seal 224 passes the flared portions 222 and expand there past. This installation method and apparatus holds the malleable seal number 224 in place and may be removed by force. Likewise, surfaces 230 of the seal 224 compress to engage outer surfaces of the side panels 46. These surfaces 230 are much further apart when non-compressed as shown. It may be desired to have the outer/visible surface substantially flat/planar when the apparatus is compressed. To facilitate perpendicular contact with another seal 224, such as at the corner shown in FIG. 51 when adjacent panel assemblies are installed.

In example shown, flashing 232 has been fitted into a channel 234 such as at the bottom edge of a wall. While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. An architectural panel assembly configured to be attached to a building surface, the architectural panel assembly comprising:
   a first outer panel having a first face panel having a plurality of first side panels extending therefrom;
   a first frame member attached to the first outer panel;
   the first frame member adjacent an inner surface of the first face panel;
   the first frame member adjacent a first side panel of the plurality of first side panels;
   the first frame member comprising surfaces defining a receiving channel extending parallel to the first face panel;

a second outer panel having a second face panel having a plurality of second side panels extending therefrom;

a second frame member attached to the second outer panel;

the second frame member adjacent an inner surface of the second face panel;

the first frame member adjacent a second side panel of the plurality of second side panels;

the first frame member comprising surfaces defining an engagement protrusion extending parallel to the face panel; and the receiving channel configured to receive the engagement protrusion;

wherein each of the first frame member and second frame member is reversible in that each of the first frame member and the second frame member comprises a first lateral side comprising the surfaces defining the engagement protrusion; and the opposing lateral side of each of the first frame member and second frame member comprises the surfaces defining the receiving channel configured to receive the engagement protrusion.

2. The architectural panel system assembly as recited in claim 1 further comprising:

a spline fitted into laterally facing spline receiving channels of the first frame member and the second frame member, the spline substantially parallel to the engagement protrusion, first face panel, second face panel, and offset therebetween.

3. An architectural panel assembly configured to be attached to a building surface, the architectural panel assembly comprising:

a first outer panel having a first face panel having a plurality of first side panels extending therefrom;

a first frame member attached to the first outer panel;

the first frame member adjacent an inner surface of the first face panel;

the first frame member adjacent a first side panel;

the first frame member comprising surfaces defining a receiving channel extending parallel to the first face panel;

a second outer panel having a second face panel having a plurality of second side panels extending therefrom;

a second frame member attached to the second outer panel;

the second frame member adjacent an inner surface of the second face panel;

the first frame member adjacent a second side panel;

the first frame member comprising surfaces defining an engagement protrusion extending parallel to the face panel; and the receiving channel configured to receive the engagement protrusion;

a frontal side of the first frame member comprises a surface defining a U-shaped channel configured to receive the first side panel of the first outer panel; and a frontal side of the second frame member comprises a surface defining a U-shaped channel configured to receive the second side panel of the second outer panel.

* * * * *